United States Patent [19]

Martin et al.

[11] 4,317,269

[45] Mar. 2, 1982

[54] APPARATUS FOR REVAPORIZING LIQUEFIED GASES

[75] Inventors: Jean-Francois Martin, La Celle St. Cloud; Michel Drouineau, Mouzillon-Lamotte, both of France

[73] Assignee: Societe Anonyme dite: Ateliers et Chantiers de Bretagne-ACB, Nantes, France

[21] Appl. No.: 212,056

[22] PCT Filed: Feb. 12, 1980

[86] PCT No.: PCT/FR80/00022

§ 371 Date: Oct. 12, 1980

§ 102(e) Date: Sep. 22, 1980

[30] Foreign Application Priority Data

Feb. 12, 1979 [FR] France ............................... 79 03432

[51] Int. Cl.$^3$ ............................................ B23P 15/26

[52] U.S. Cl. ......................... 29/157.3 R; 29/157.3 A; 29/157.4; 29/157 T; 228/183; 228/184; 165/183; 165/70; 285/13; 62/52

[58] Field of Search ................ 29/157.3 R, 157.3 AH, 29/157.4, 157.3 A, 157 T; 228/183, 184; 165/183, 184, 70; 285/13; 62/52

[56] References Cited

U.S. PATENT DOCUMENTS

| | | | |
|---|---|---|---|
| 2,183,043 | 12/1939 | Kerr | 29/157.4 |
| 2,216,033 | 9/1940 | Hopkins | 29/157 C |
| 2,286,271 | 6/1942 | Higham et al. | 257/149 |
| 2,294,030 | 8/1942 | Higham et al. | 257/149 |
| 2,322,341 | 6/1948 | Booth | 165/131 |

*Primary Examiner*—Francis S. Husar
*Assistant Examiner*—V. K. Rising
*Attorney, Agent, or Firm*—Sughrue, Mion, Zinn, Macpeak and Seas

[57] ABSTRACT

An assembly for revaporizing liquefied gases. The arrangement is of the running water type and includes a nest of tubes (1) preferably grouped to form panels and connected to inlet and outlet manifolds and over which water is caused to flow. To withstand the corrosion of salt water, an A-G4MC alloy is used and the cross-section of each tube 1 includes two diametrally opposite outer fins 2,3 and inner fins 5. Said tube is produced preferably by extrusion.

Application to vaporization of natural gas.

1 Claim, 2 Drawing Figures

APPARATUS FOR REVAPORIZING LIQUEFIED GASES

FIELD OF THE INVENTION

The present invention relates to apparatus for revaporizing liquefied gases such as methane at low temperature.

BACKGROUND OF THE INVENTION

Various gases, e.g. methane or natural gas are stored and/or transported in the liquid state at a very low temperature, e.g. 160° C., and to use them, it is necessary to bring them to a temperature close to ordinary temperature and to the gaseous state. Said revaporization takes place usually at a fairly high pressure, e.g. about 100 bars, in heat exchangers of the running water type which are constituted by nests of tubes through which the product to be revaporized passes and over whose surface water runs.

The tubes which form the nest are welded to an inlet manifold where the product is brought in under pressure at low temperature and in the liquid state and to an outlet manifold where the vaporized product is at about the same pressure as at the inlet but is at a temperature close to ambient temperature.

Up till now, aluminium alloy of the A-GS type containing magnesium and silicon or of the A-Z5G type containing about 5% of zinc and magnesium in a smaller concentration have been used for manufacturing revaporizer apparatus.

These alloys give rise to difficulties as far as concerns their mechanical characteristics and welding. Further, they have the disadvantage of poor resistance to corrosion in contact with water containing chlorides, e.g. briny water which is frequently found in the neighbourhood of ports where methane transporter ships are unloaded. Corrosion occurs especially at the points where the tubes are welded to the manifolds.

It is obvious that other alloys could be used, but then, they give rise to production and shaping difficulties so that they can be used only in the form of very simply designed tubes and poor exchange coefficients are obtained. This makes it necessary to provide apparatuses of larger dimensions which are more expensive. The problem that arises is therefore that of obtaining a satisfactory combination between the kind of metal, the welding method and the design of the apparatus and, in particular, of the tubes.

SUMMARY OF THE INVENTION

The present invention therefore provides revaporizing apparatus for liquefied gases, said apparatus including a nest of tubes made of aluminium alloy and containing magnesium which are welded at one of their ends to an inlet manifold which collects the liquefied gas at low temperature and high pressure and, at the other end, to an outlet manifold which removes the revaporized gas at a temperature close to ambient temperature and at a pressure close to that of the inlet manifold. The arrangement further includes means for causing water to stream on the outer surfaces of the tubes. The invention is characterized in that the alloy used contains: magnesium: 3.5 to 4.5%; manganese: 0.2 to 0.7%; chromium: 0.05 to 0.25%, and at the most 0.4% of silicon, 0.5% of iron, 0.10% of copper, 0.25% of zinc and 0.15% of titanium. The remainder is aluminium with usual impurities. Each tube includes, along practically its whole length, firstly inner fins, and secondly, two outer fins which are diametrally opposite.

The invention is described in greater detail with reference to the figures.

DESCRIPTION OF THE PREFERRED EMBODIMENT

Figure 1:
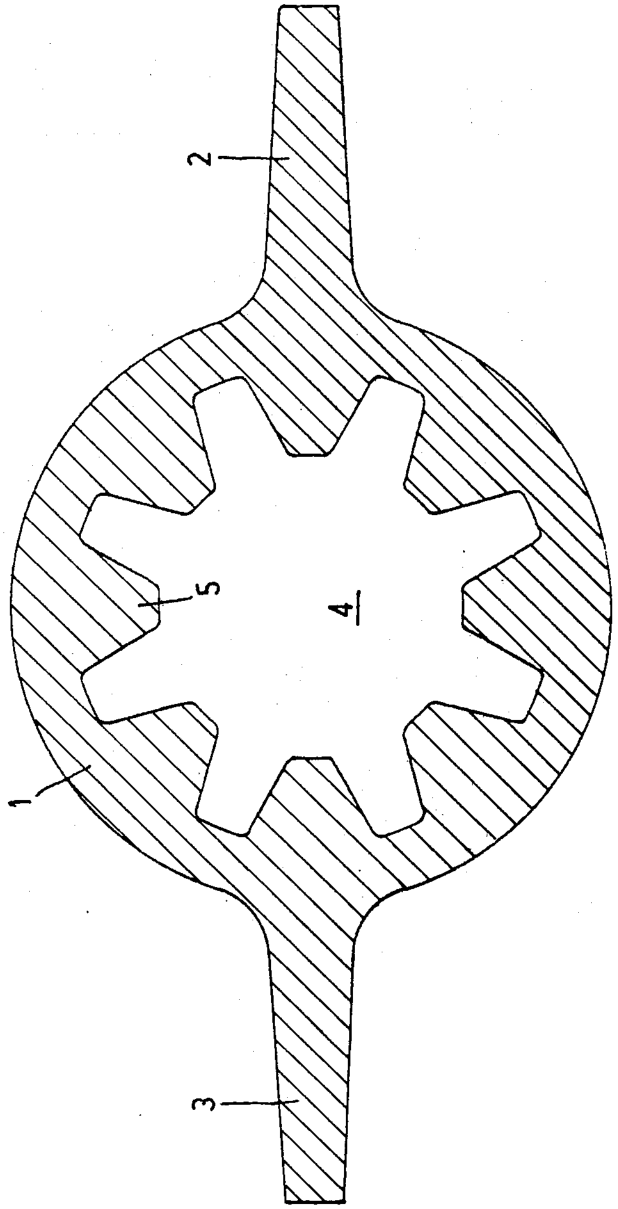
FIG. 1 illustrates a cross-section of a tube of the vaporizer apparatus.

In FIG. 1, the cross-section of a tube has a circular central body 1 provided with two diametrically opposed outer fins 2 and 3 each having a truncated tapering cross-section and each being made integral with the body by a bead.

The body has an inner passage 4 with eight inner fins 5.

The wall of the tube has a thickness between two fins which is 1/10th that of the diameter of the body while the radial length of the fins is about one and a half times said thickness. The tube is extruded since the alloy used, known by the name of A-G4MC, is very well adapted to such a technique. In one practical embodiment, each tube is about 5 m long, the outer diameter of the body is 40 mm, the length of the outer fins is 20 mm and the length of the inner fins is 6 mm.

The special shape of the tubes has required a special technique to be developed to weld these tubes on the manifolds.

The manifolds or collectors are tubes whose diameter is appreciably greater than that of the vaporizing tubes and made of the same metal. Their walls are thick to withstand the pressure and weight of the vaporizing tubes and have flat surface portions on their upper and lower sides. The width of these flat surface portions is greater than the outer diameter of the bodies of the vaporizing tubes.

Figure 2:
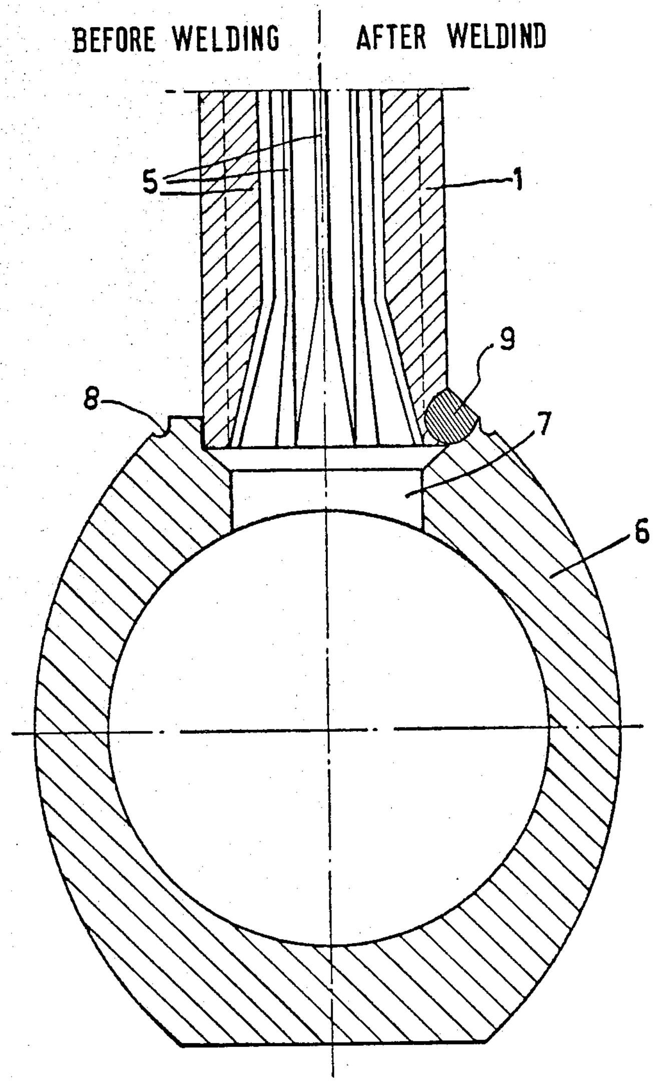
FIG. 2 is a diagram showing the welding method.

FIG. 2 illustrates a cross-section of the tube and a manifold.

Preparatory operations include:

(a) removing part of the outer fins 2 along a length of about 120 mm;

(b) conically boring the inside of the tube 1 so as to reduce the height of the inner fins 5 progressively to zero but without reducing the thickness of the tube between said fins;

(c) drilling a radial bore in the collector 6 at the flat surface portion to a diameter equal to the inside diameter of the tube 1 at the end where removal of the fins 5 occurred;

(d) counterbore drilling the bore of the collector 6 concentrically with the bore described in (c) starting from the flat surface portion down to a depth of about 5 mm with a counterbore having a diameter equal to the outside diameter of the tube 1;

(e) forming a groove 8 on the collector which groove is concentric with the bore 7, the space between said bore and said groove being equal to twice the thickness of the wall of the tube 1 outside the inner fins (said groove reduces the concentration of stresses at the weld);

(f) fitting the tube 1 in the bore described in (d); and (g) by a first welding operation, welding the tube 1 at 9 to the flat surface portion of the manifold 6.

The tubes are welded on the manifolds with their outer fins in the same plane and separated by a gap of the order of one millimeter so as to form a nest of tubes. The gaps provided between the tubes are such that they allow expansion without any danger of giving rise to any discontinuity due to the layer of water that streams along the nest of tubes.

A heating water distributor is disposed around the outlet manifold; it is constituted by a duct with an opening through which a suitable flow of water is let out onto both sides of the nest of tubes.

In accordance with one advantageous disposition, the nest of tubes extends beyond the last tube by an extruded bar which is parallel to said tube, the bar having at least one fin situated in line with the outer fin of said tube which outer fin points towards the outside of the nest of tubes, said bar fin being separated from said outer tube fin by the same distance as that which separates the outer tube fins from one another inside the nest of tubes, e.g. about 1 mm. Discontinuity of the layer of water that streams along the edge of the last tube is thereby avoided.

We claim:

1. In a method of manufacturing an apparatus for vaporizing liquid gases, the steps comprising:

(a) providing an elongated tubular manifold, said manifold having a longitudinal bore and a longitudinally extending exterior flat portion;

(b) providing an elongated tube having a longitudinally extending bore said bore defined by a plurality of circumferentially spaced, radially inwardly extending fins, the exterior of said tube having two diametrically opposed fins extending radially outwardly from and longitudinally of said tube exterior;

(c) said flat portion of said manifold having a width at least equal to the diameter of the exterior of said tube;

(d) removing said diametrically opposed fins along a length of about 120 mm from one end of said tube;

(e) conically boring the inside of the tube at said one end so as to reduce the height of the inner fins progressively from the axial end inwardly to zero but without reducing the thickness of the tube between said fins;

(f) drilling a radial bore in the manifold centered on said flat surface portion to a diameter equal to the inside diameter of the tube at said one end;

(g) counterbore drilling the bore of the manifold concentrically with the bore described in (f) starting from the flat surface portion down to a depth of about 5 mm to a diameter equal to the outside of said tube at said one end;

(h) forming a groove on the manifold which groove is concentric with said radial bore, the space between said bore and said groove being equal to twice the thickness of the wall of the tube outside the inner fins;

(i) fitting said one end of said tube in the counterbore described in (g); and (j) welding the exterior of said tube at said one end to the flat surface portion of said manifold.

* * * * *